US009304326B2

(12) United States Patent
Dong

(10) Patent No.: US 9,304,326 B2
(45) Date of Patent: Apr. 5, 2016

(54) LENS ACTUATOR

(71) Applicant: Leping Dong, Shenzhen (CN)

(72) Inventor: Leping Dong, Shenzhen (CN)

(73) Assignee: AAC Technologies Pte. Ltd., Singapore (SG)

( * ) Notice: Subject to any disclaimer, the term of this patent is extended or adjusted under 35 U.S.C. 154(b) by 0 days.

(21) Appl. No.: 14/613,756

(22) Filed: Feb. 4, 2015

(65) Prior Publication Data

US 2016/0054578 A1 Feb. 25, 2016

(30) Foreign Application Priority Data

Aug. 25, 2014 (CN) .......................... 2014 2 0482767

(51) Int. Cl.
G02B 27/64 (2006.01)
G02B 7/04 (2006.01)
G03B 3/10 (2006.01)
G03B 5/00 (2006.01)

(52) U.S. Cl.
CPC ................ *G02B 27/646* (2013.01); *G02B 7/04* (2013.01); *G03B 3/10* (2013.01); *G03B 5/00* (2013.01)

(58) Field of Classification Search
CPC ........ G02B 27/646; G02B 27/64; G02B 7/04; G02B 7/09
See application file for complete search history.

(56) References Cited

U.S. PATENT DOCUMENTS

2012/0314308 A1* 12/2012 Ikushima ................. G02B 7/08
359/814
2014/0368936 A1* 12/2014 Hu ....................... G02B 27/646
359/824

* cited by examiner

*Primary Examiner* — James Phan
(74) *Attorney, Agent, or Firm* — IPro, PLLC; Na Xu

(57) ABSTRACT

A lens actuator is disclosed in the present invention. The lens actuator includes a movable unit including a carrier defining an optical axis, a plurality of focusing coils surrounding the carrier and spaced with each other, each wound around an axis perpendicular to the optical axis, fixed on an outer surface of the carrier, a plurality of magnets each opposite to one of the focusing coils in a direction perpendicular to the optical axis direction, and a holder fixing the magnets; a plurality of shake correction coils each disposed below one of the magnets and opposite to the magnet in the optical axis direction; a base fixing the shake correction coils; and wires connecting the movable unit to the base.

20 Claims, 5 Drawing Sheets

LENS ACTUATOR

FIELD OF THE INVENTION

The present disclosure generally relates to the art of driving apparatus, and more particularly to a lens actuator with optical image-stabilization (OIS) function.

DESCRIPTION OF RELATED ARTS

With the development of camera technologies, lens actuators are widely used in various digital devices equipped with cameras, like cell phones, video cameras, laptop computers and so on.

A lens actuator used in a digital device usually includes a lens holder, a lens disposed in the lens holder, a coil wound around the lens holder and a stationary magnet separated from the coil and interacted with the coil for generating an electromagnetic force for driving the coil together with the lens to move approaching or away along an optical axis. However, shake of the digital device occurs easily due to hand-held shooting during the photographing process, which directly causes image blur.

Therefore, an improved lens actuator is provided in the present disclosure to solve the problem mentioned above.

BRIEF DESCRIPTION OF THE DRAWINGS

Many aspects of the embodiment can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION OF THE EXEMPLARY EMBODIMENT

Figure 1:
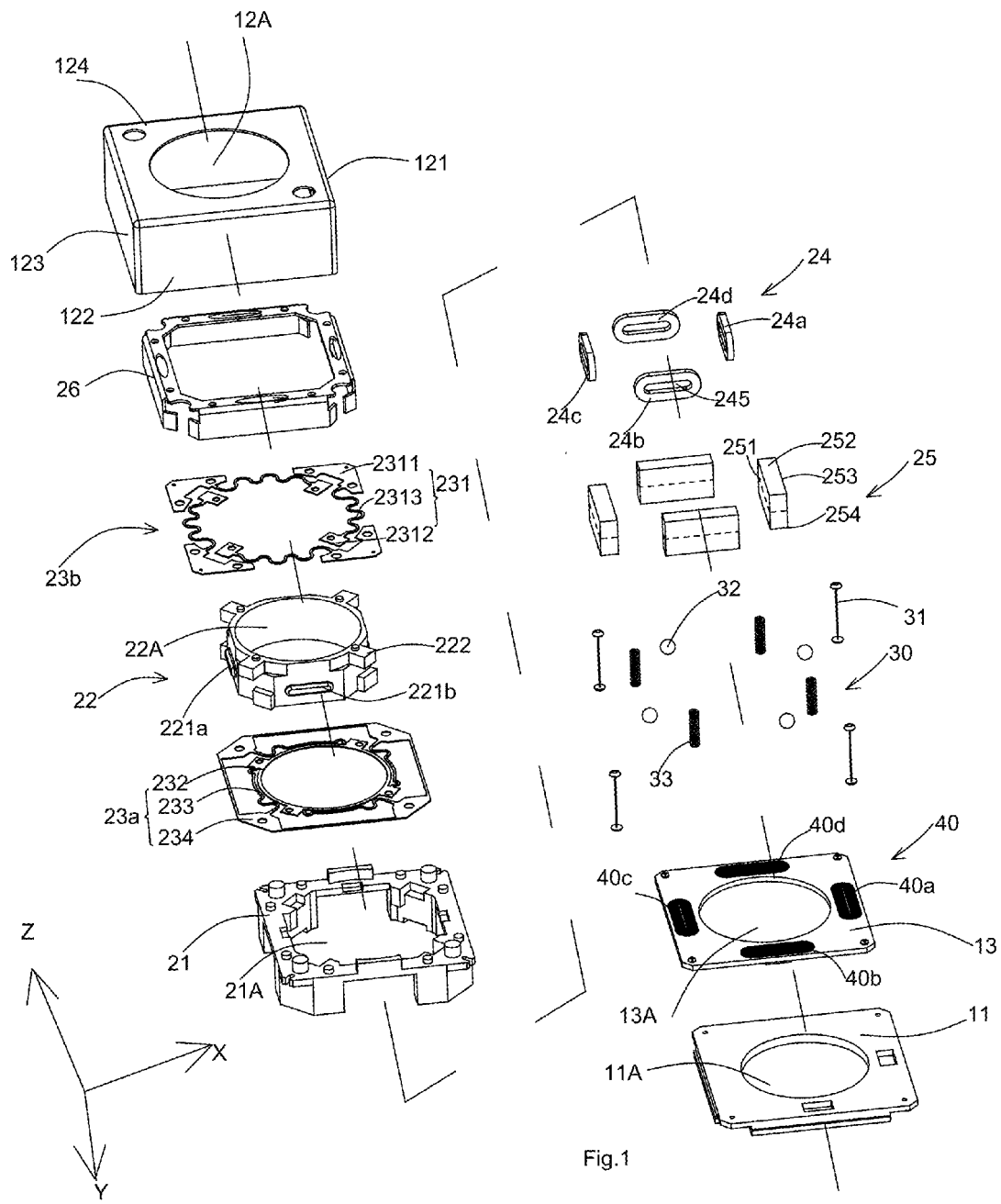
FIG. 1 is an exploded view of a lens actuator according to an exemplary embodiment of the present disclosure.

While the invention is susceptible of embodiments in many different forms, there is shown in the drawings and will herein be described in detail embodiment of the invention with the understanding that the present disclosure is to be considered as an exemplification of the principles of the invention and is not intended to limit the broad aspect of the invention to the embodiment illustrated.

Figure 2:
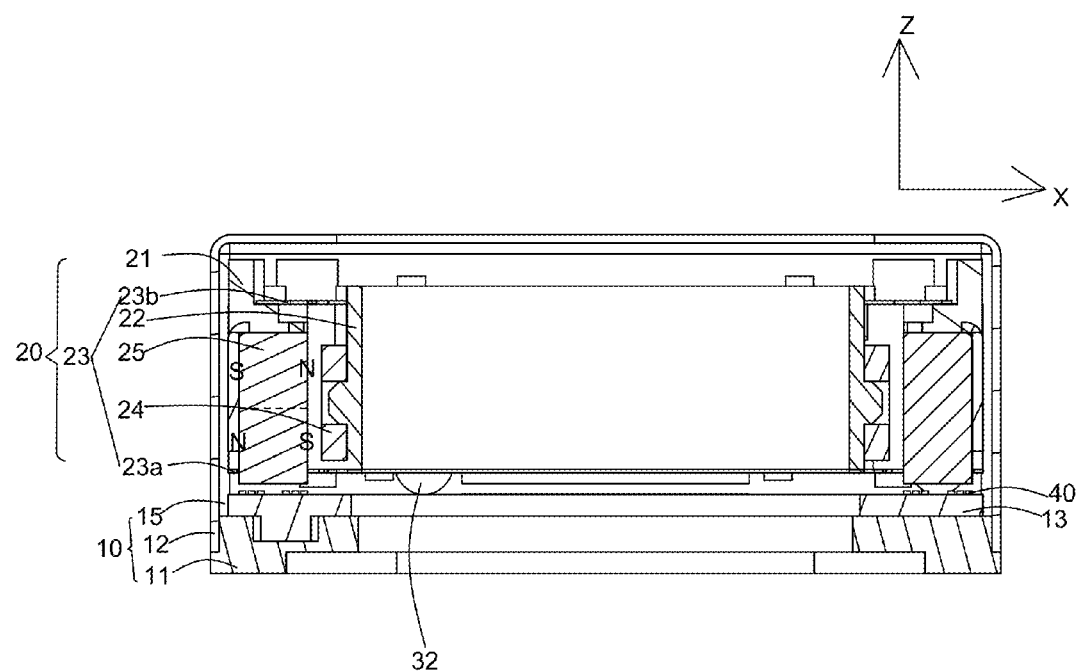
FIG. 2 is a cross-sectional view of the lens actuator in FIG. 1.
Figure 3:
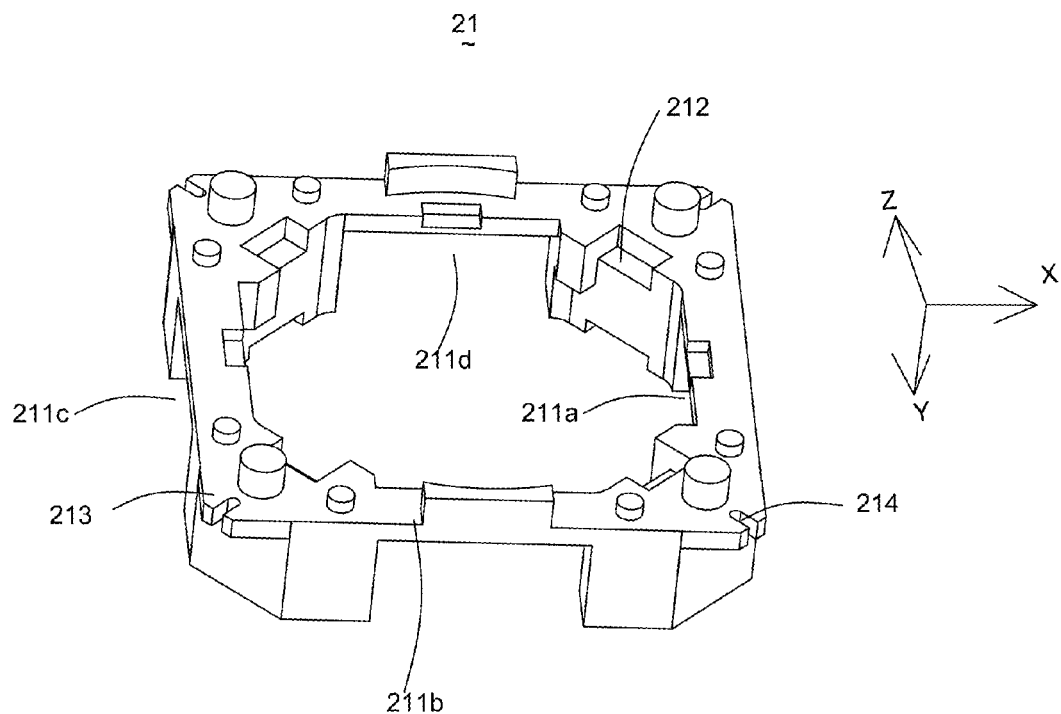
FIG. 3 is an illustrative isometric view of a magnet holder of the lens actuator in FIG. 1.
Figure 4:
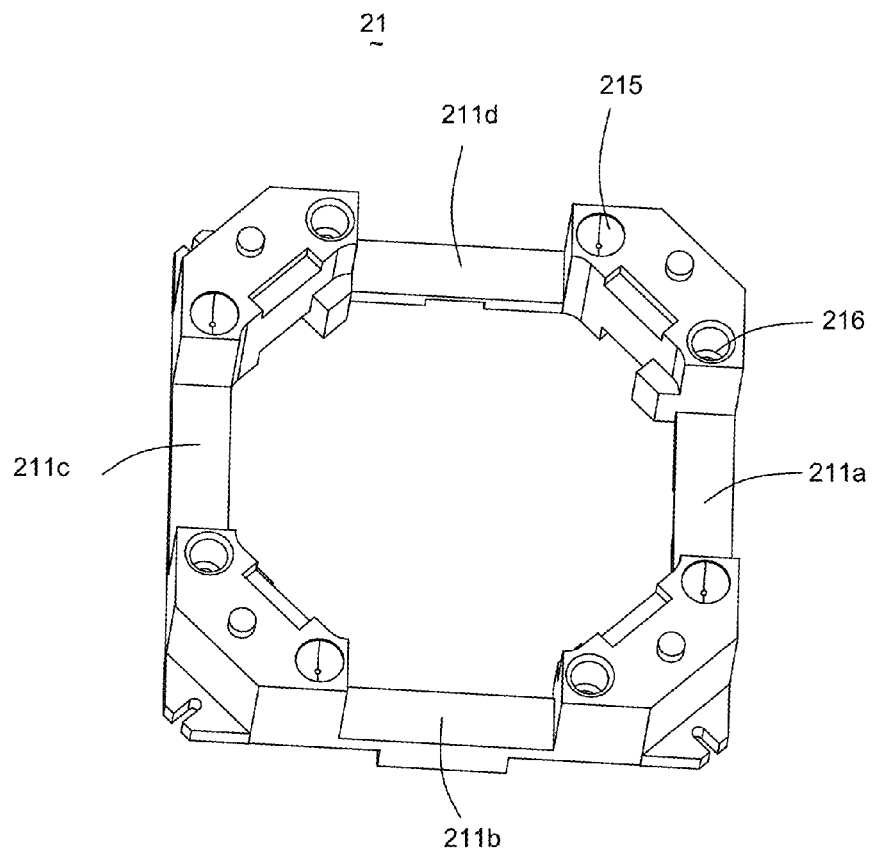
FIG. 4 is also an illustrative isometric view of the magnet holder, but from another aspect.
Figure 5:
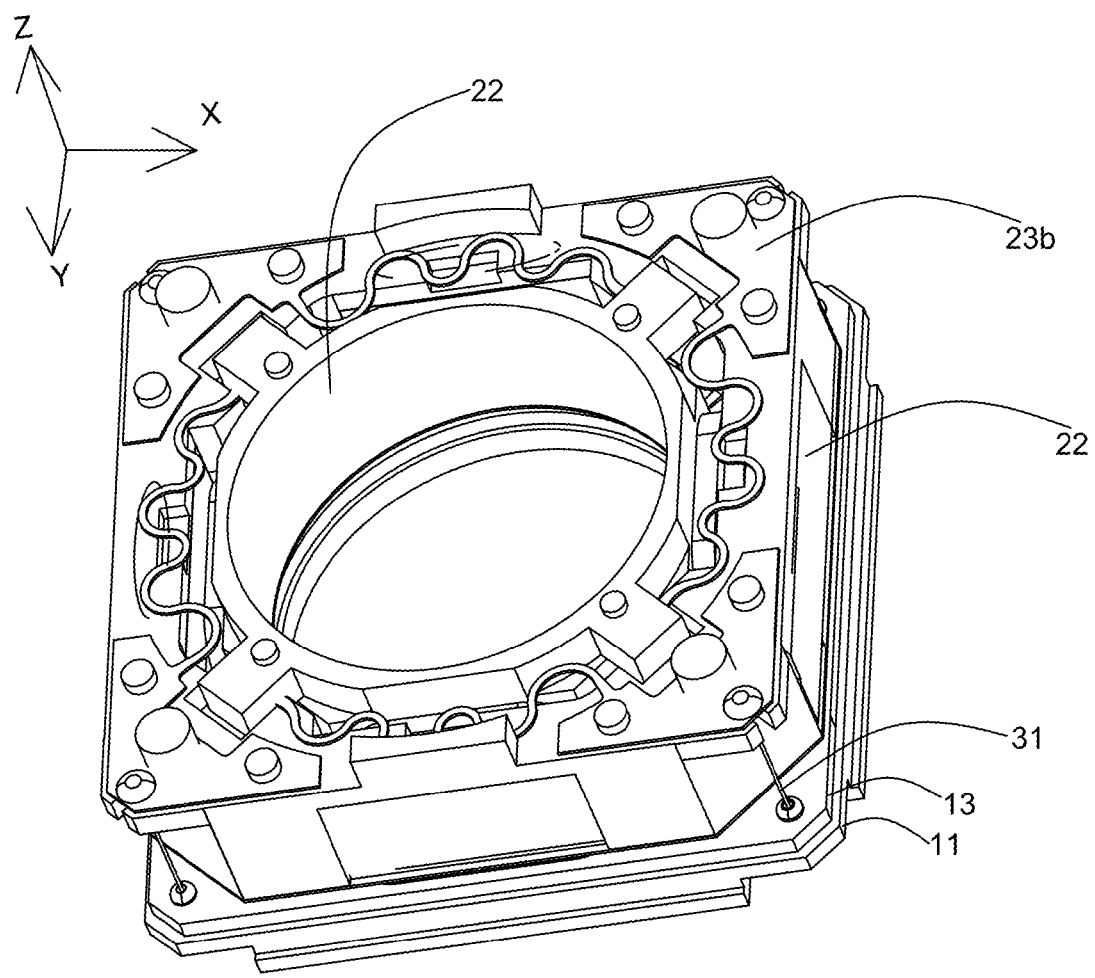
FIG. 5 is an assemble view of an assembly of a movable unit, a printed circuit board, and a base of the lens actuator in FIG. 1.
Figure 6:
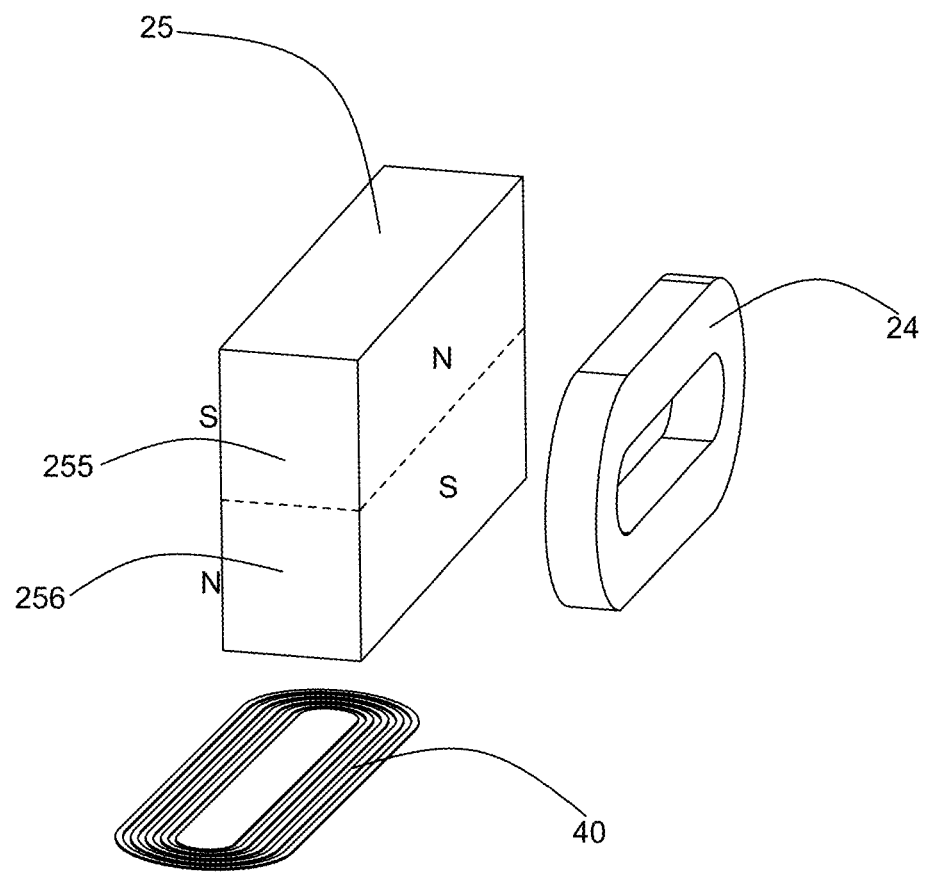
FIG. 6 shows relative position relationship between a focusing coil, a magnet and a shake correction coil of the lens actuator in FIG. 1.

Referring to FIGS. 1-2, a lens actuator 100 according to the exemplary embodiment of the present disclosure is mounted to a mobile terminal such as a camera-equipped cellular mobile phone which is enable automatic focusing (AF), a smart phone, a notebook personal computer, a tablet-type personal computer, a mobile-type game machine, a Web camera, a vehicle-mounted camera, or the like.

The lens actuator 100 includes a housing 10 having a base 11, a cover 12 assembled with the base 11 for forming a receiving space 15, a movable unit 20 received in the receiving space 15 and movably mounted on the base 11, and a plurality of wires 31 connected the movable unit 20 to the base 11. The movable unit 20 defines an optical axis.

The cover 12 has a rectangular box shape that includes a first round hole 12A in the center. The base 11 has a rectangular plate shape that includes a second round hole 11A in the center. The housing 10 further includes a printed circuit board 13 fixed on the base 11 by adhesive, gluing or the like. The printed circuit board 13 has a rectangular plate shape that has a third round hole 13A in the center. The cover 12 and the base 11 are made of nonmagnetic material, such as aluminum and nickel-silver alloy.

A coordinate system (X, Y, Z) is defined. The optical axis is referred as Z axis, and an upper direction of the optical axis is hereafter referred as a forward direction +Z (+Z side). When viewed from the +Z side, the four sides of the cover 12 are denoted respectively by 121, 122, 123, 124 in a clockwise direction. The direction from the side 123 toward the side 121 is designated as a forward direction of the X axis (+X side); the direction from the side 124 toward the side 122 is designated as a forward direction of the Y axis (+Y side). The X axis and Y axis are orthogonal to the optical axis (Z axis) and perpendicular to each other.

The movable unit 20 includes a magnet holder 21 having a receiving hole, a spring plate connected with the magnet holder 21, a lens holder 22 elastically suspended in the receiving hole by the spring plate, a plurality of focusing coils 24 fixed on the lens holder 22, a plurality of magnets 25 each facing one of the focusing coils 24 and fixed on the magnet holder 21, and a magnetic conduction member 26 attached on outer surfaces of the magnets 25 for effectively conducting magnetic fluxes.

Referring to FIGS. 3-6 and FIG. 1, the magnet holder 21 is made of insulating resin, such as polycarbonate containing glass, and has a rectangular box shape that has a square hole 21A in the center. Such square hole 21A serves as the receiving hole. The magnet holder 21 has a first receiving groove 211a, a second receiving groove 211b, a third receiving groove 211c, and a fourth receiving groove 211d, which are formed on four sidewalls thereof respectively for receiving the magnets 25. The first and third receiving grooves 211a, 211c are arranged on the +X side portion and the −X side portion of sidewalls of the magnet holder 21. The second and fourth receiving grooves 211b, 211d are arranged on the +Y side portion and the −Y side portion of sidewalls of the magnet holder 21. Four holder-side limbs 213 overhanging on four corners are provided on a top surface of the magnet holder 21. Four holder-side latches 214 that constitute a U-shape groove are provided in the holder-side limbs 213 respectively. Four accommodating grooves 212 are formed on an inner surface of the magnet holder 21 and disposed in four corners of the magnet holder 21 for receiving the lens holder 22. At least three mounting grooves 215 or blind holes 216 are formed on a bottom surface of the magnet holder 21. In this embodiment, four mounting grooves 215 or/and blind holes 216 are formed on the bottom surface of the magnet holder 21 and disposed in four corners of the magnet holder 21 respectively.

The spring plate 23 includes an upper spring plate 23b and a lower spring plate 23a connected to an upper end and a lower end of the lens holder 22 respectively along the optical axis Z. The upper spring plate 23b is a conductive-metal plate spring, which includes four separated spring element 231 arranged in a clockwise direction to form a spring ring to support the lens holder 22. Each spring element 231 includes a first connecting portion 2312 connected with the lens holder 22, a second connecting portion 2311 fixed on the magnet holder 21, and an elastic arm 2313 connected between the first and second connecting portions 2312, 2311. The lower spring plate 23a is a conductive-metal plate spring, which includes an outer peripheral portion 234 connected with the magnet holder 21, an inner periphery portion 232 connected with the lens holder 22 and a plurality of meandering springs 233 connected between the inner periphery portion 232 and the outer periphery portion 234.

The lens holder 22 is made of insulating resin, such as polycarbonate containing glass, and has an octagon box shape that has a fourth round hole 22A in the center for fixing lens (not shown). A screw thread may be included inside the fourth round hole 22A for fixing the lens to the lens holder 22 firmly. The lens holder 22 has a pair of first projections 221a and a pair of second projections 221b. All of the projections 221a, 221b are protruding toward the magnet holder 21 from the outer surface of the lens holder 22, surrounding the lens holder 22 and spaced with each other. The two first projections 221a are opposite to the first and third receiving grooves 211a, 211c in the X axis direction, respectively. The two second projections 221b are opposite to the second and fourth receiving grooves 211b, 211d in the Y axis direction, respectively. The number of the projections is not limited to this, which may be varied according to the actual requirement. Four protruding parts 222 are formed on a top end of the lens holder 22 and each corresponding to one of the accommodating grooves 212 of the magnet holder 21 for connecting to the magnet holder 21. When assembled, the protruding part 222 is connected with the first connecting portion 2311 of the upper spring plate 23b by screw tread connection, and then both of the protruding part 222 and the first connecting portion 2311 are received in the accommodating groove 212 for connecting to the magnet holder 21. The fourth round hole 22A, first round hole 12A, third round hole 13A, second round hole 11A are continuously made to form a through hole from the upper surface to the lower surface of the lens actuator 100.

The focusing coils 24 includes a first focusing coils 24a, a second focusing coil 24b, a third focusing coil 24c, and a fourth focusing coil 24d, each of the focusing coils attached on the outer surface of the lens holder 22 by fixed on the first through fourth projections 221 respectively. The first and third focusing coils 24a, 24c wind around the X axis and are fixed on the two first projections 221a respectively. The second and fourth focusing coils 24b, 24d wind around the Y axis and are fixed on the two second projections 221b respectively. In this embodiment, all of the focusing coils 24 have a hole 245 in the center for receiving the projections 221.

The magnets 25 are fixed on the magnet holder 21 by receiving in the receiving grooves 211a, 211b, 211c, 211d thereof. Each magnet 25 faces corresponding focusing coil 24 with a space therebetween for interacting with the focusing coil 24 to generate electromagnetic force to move the lens holder in the optical axis direction relative to the magnet holder. Each magnet 25 has a rectangular solid shape and includes an inner surface 251 facing one focusing coil 24, an outer surface 253 opposite to the inner surface 251, a bottom surface 254 facing the base 11 and a top surface 252 opposite to the bottom surface 254. In this embodiment, each magnet 25 is divided into a first half part 255 and a second half part 256. The first and second half parts 255, 256 are magnetized such that magnetic poles on inner surfaces of the first and second half parts 255, 256 differ from each other, and such that magnetic poles on outer surfaces of the first and second half parts 255,256 also differ from each other. For example, the inner surface of the first half part 255 is magnetized into a N-pole while the outer surface thereof is magnetized into a S-pole; and the inner surface of the second half part 256 is magnetized into a S-pole while the outer surface thereof is magnetized into a N-pole. Alternatively, the magnet 25 may include two separated permanent magnet which are magnetized in different directions.

The shake correction coils 40 includes a first shake correction coil 40a, a second shake correction coil 40b, a third shake correction coil 40c, and a fourth shake correction coil 40d, each of the shake correction coils fixed on the printed circuit board 13, below the magnets 25 and face the lower surfaces 254 of the magnets 25 with a space therebetween. The first and third shake correction coils 40a, 40c are disposed on the +X side portion and the −X side portion of the printed circuit board 13, and the second and fourth shake correction coils 40b, 40d are disposed on the +Y side portion and the −Y side portion of the printed circuit board 13. Optionally, the shake correction coils 40 are printed coils that are formed by film deposition and patterning. When the currents flow through the shake correction coils, the electromagnetic forces generated by the magnets and the shake correction coils drive the movable unit to move in the X axis direction and the Y axis direction relative to the base.

The lens actuator 100 further comprises a supporter 30 located between the magnet holder 21 and the base 11 for making the magnet holder 21 movably mounted on the base 11. The supporter 30 may include four balls 32. Each ball 32 has one part received in the mounting groove 215 of the magnet holder 21 and another part resting against the base 11 to movably support the magnet holder 21. Alternatively, the supporter 30 may include four helical springs 33. One end of each helical spring 33 is received in the blind hole 216 of the magnet holder 21 and another end of the helical spring 33 rests against the base 11 for elastically supporting the magnet holder 21.

The focusing coils 24 are electrically connected to the printed circuit board 13 through the upper spring plate 23b, lower spring plate 23a and wires 31. The shake correction coils 40 are electrically connected to the printed circuit board 13 while connected in series.

When the camera shake occurs while the shooting is performed by pressing a shutter push button, the electronic circuit using a magnetic-field sensor or the like that is separately provided in the electronic instrument detects the position of the movable unit. Then the electronic circuit moves the movable unit 20 in the X direction and the Y direction by controlling the currents flowing through shake correction coils 25, thereby performing shake correction control.

When the swing of the optical axis occurs, the electronic circuit detects the position of the optical axis using a position sensor or the like that is separately provided in the electronic instrument. The electronic circuit moves the lens holder 22 moves along the optical axis direction by controlling the currents flowing through the focusing coils 24, thereby performing swing correction control.

While the present invention has been described with reference to a specific embodiment, the description of the invention is illustrative and is not to be construed as limiting the invention. Various of modifications to the present invention can be made to the exemplary embodiment by those skilled in the art without departing from the true spirit and scope of the invention as defined by the appended claims.

What is claimed is:

1. A lens actuator, comprising:
   a movable unit comprising, a carrier defining an optical axis in a center thereof,
a plurality of focusing coils surrounding the carrier and spaced with each other, each of the focusing coils wound around an axis perpendicular to the optical axis and fixed on an outer surface of the carrier,
a plurality of magnets each opposite to one of the focusing coils in a direction perpendicular to the optical axis direction,
a holder fixing the magnets;
a plurality of shake correction coils each disposed below one of the magnets and opposite to the magnet in the optical axis direction;
a base fixing the shake correction coils;
a plurality of wires connecting the movable unit to the base; wherein
the carrier moves in the optical axis direction by an electromagnetic force generated between the focusing coils and the magnets, the movable unit moves in the direction perpendicular to the optical axis direction by another electromagnetic force generated between the shake correction coils and the magnets.

2. The lens actuator of claim 1, wherein the focusing coils comprises a first focusing coil, a second focusing coil, a third focusing coil and a fourth focusing coil, the first and third focusing coils wound around a first axis perpendicular to the optical axis and fixed on the carrier in the first axis direction; and the second and fourth focusing coils wound around a second axis perpendicular to the optical axis and fixed on the carrier in the second axis direction; wherein the first axis is perpendicular to the second axis.

3. The lens actuator of claim 2 further comprising a printed circuit board mounted on the base and electronically connected with the focusing coils;
the shake correction coils are printed coils formed on the printed circuit board.

4. The lens actuator of claim 1 further comprising a supporter located between the movable unit and the base for movably mounting the movable unit on the base.

5. The lens actuator of claim 4, wherein the supporter includes a plurality of balls for supporting the movable unit.

6. The lens actuator of claim 5, wherein the movable unit has a plurality of mounting grooves in a bottom surface thereof for receiving the balls.

7. The lens actuator of claim 4, wherein the supporter includes a plurality of helical springs for supporting the movable unit.

8. The lens actuator of claim 7, wherein the movable unit has a plurality of blind holes in a bottom surface thereof for receiving the helical springs.

9. The lens actuator of claim 1, wherein each magnet is divided into a first half part and a second half part, wherein the first and second half parts are such magnetized that magnetic poles on inner surfaces of the first and second half parts differ from each other, and such that magnetic poles on outer surfaces of the first and second half parts also differ from each other.

10. The lens actuator of claim 1, wherein the carrier received in the holder includes a plurality of projections each protruding toward the holder from the outer surface of the carrier and corresponding to one of the focusing coils for engaging with the focusing coils.

11. A lens actuator comprising,
a housing comprising a base and a cover assembled with the base for forming a receiving space;
a movable unit received in the receiving space and comprising:
a magnet holder movably mounted on the base and defining a receiving hole,
a spring plate connected with the magnet holder,
a lens holder defining an optical axis and elastically suspended in the receiving hole by the spring plate,
a plurality of focusing coils surrounding the lens holder and spaced with each other, each of the focusing coils wound around an axis perpendicular to the optical axis, and attached on an outer surface of the lens holder;
a plurality of magnets mounted on the magnet holder and each opposite to one of the focusing coils in a direction perpendicular to the optical axis direction,
a plurality of shake correction coils fixed on the base and each positioned below one of the magnets and facing the magnet with a space therebetween;
a plurality of wires connected the magnet holder to the base; wherein, the lens holder moves in the optical axis direction by an electromagnetic force generated between the focusing coils and the magnets, the movable unit moves in the direction perpendicular to the optical axis direction by another electromagnetic force generated between the shake correction coils and the magnets.

12. The lens actuator of claim 11, wherein the focusing coils comprise a first focusing coil, a second focusing coil, a third focusing coil and a fourth focusing coil, the first and third focusing coils wound around a first axis perpendicular to the optical axis and fixed on the lens holder in the first axis direction; and the second and fourth focusing coils wound around a second axis perpendicular to the optical axis and fixed on the lens holder in the second axis direction; wherein the first axis is perpendicular to the second axis.

13. The lens actuator of claim 12 further comprises a printed circuit board mounted on the base and electronically connected with the focusing coils;
the shake correction coils are printed coils formed on the printed circuit board.

14. The lens actuator of claim 11 further comprises a supporter located between the magnet holder and the base for movably mounting the movable unit on the base.

15. The lens actuator of claim 14, wherein the supporter includes a plurality of balls for supporting the movable unit.

16. The lens actuator of claim 15, wherein the movable unit has a plurality of mounting grooves in a bottom surface thereof for receiving the balls.

17. The lens actuator of claim 14, wherein the supporter includes a plurality of helical springs for supporting the movable unit.

18. The lens actuator of claim 17, wherein the movable unit has a plurality of blind holes in a bottom surface thereof for receiving the helical springs.

19. The lens actuator of claim 11, wherein each magnet is divided into a first half part and a second half part, wherein the first and second half parts are such magnetized that magnetic poles on inner surfaces of the first and second half parts differ from each other, and such that magnetic poles on outer surfaces of the first and second half parts also differ from each other.

20. The lens actuator of claim 11, wherein the lens holder received in the magnet holder includes a plurality of projections each protruding toward the magnet holder from an outer surface of the lens holder and corresponding to one of the focusing coils for engaging with the focusing coils.

* * * * *